United States Patent [19]

Krams et al.

[11] Patent Number: 5,532,728
[45] Date of Patent: Jul. 2, 1996

[54] LASER SCANNING APPARATUS

[75] Inventors: Zvi Krams, Raanana; Dov Berman, Hofit; Avigdor Bieber, Raanana; Avinoam Livni, Haifa, all of Israel

[73] Assignee: Scitex Corporation Ltd., Herzlia Bet, Israel

[21] Appl. No.: 87,303

[22] Filed: Jul. 8, 1993

[30] Foreign Application Priority Data

Jul. 10, 1992 [IL] Israel ........................................ 102463

[51] Int. Cl.$^6$ ........................................................ B41J 2/47
[52] U.S. Cl. ............................................................ 347/257
[58] Field of Search ................................ 346/107 R, 108, 346/160, 1.1; 342/256, 257, 258, 259

[56] References Cited

U.S. PATENT DOCUMENTS

| | | |
|---|---|---|
| 4,069,823 | 1/1978 | Isakov et al. . |
| 4,149,798 | 4/1979 | McGowan et al. . |
| 4,266,252 | 5/1981 | Cox et al. . |
| 4,347,001 | 8/1982 | Levy et al. . |
| 4,354,156 | 10/1982 | Neumann et al. . |
| 4,636,043 | 1/1987 | Bellar . |
| 4,809,028 | 2/1989 | Gagnon ................................... 346/108 |
| 4,975,714 | 12/1990 | Rose ........................................ 346/108 |
| 5,212,500 | 5/1993 | Herrigan et al. ....................... 346/108 |
| 5,379,059 | 1/1995 | Winson .................................. 346/108 |

FOREIGN PATENT DOCUMENTS

| | | |
|---|---|---|
| 0179939 | 5/1986 | European Pat. Off. . |
| 2103828 | 2/1983 | United Kingdom . |
| 8804121 | 6/1988 | WIPO . |

OTHER PUBLICATIONS

Patent Abstracts of Japan vol. 8, No. 137 (p–282) 26 Jun. 1984.
Patent Abstracts of Japan vol. 12, No. 266 (p–735) 26 Jul. 1988.

Primary Examiner—Mark J. Reinhart

[57] ABSTRACT

Laser scanning apparatus includes a machine frame, a first supporting member for supporting a working medium, and a second supporting member for supporting at least the delivery end of a laser beam delivery system. One of the supporting members, preferably the latter one, is a movable carriage mounted in cantilever fashion from one side of the machine frame for effecting relative movement between the working medium and the laser beam delivery system to cause the laser beam to scan the working medium.

18 Claims, 5 Drawing Sheets

LASER SCANNING APPARATUS

FIELD AND BACKGROUND OF THE INVENTION

The present invention relates to laser scanning apparatus, and particularly to such scanning apparatus in which a laser beam is used for writing (e.g., recording or plotting) data on a working medium, or for reading (e.g., sensing) data on a working medium.

The conventional flat bed type laser scanners generally include a machine frame, a supporting member mounted to the machine for supporting the working medium, such as a flat sheet, and another supporting member mounted to the machine frame for supporting at least a part of a laser beam delivery system. In some constructions, the laser beam delivery system (or at least the delivery end thereof) is mounted on the carriage movable over the working medium, and in other systems the working medium is mounted on the carriage movable with respect to the laser beam delivery system. The carriage in both systems is generally mounted for movement along guides on the two opposite sides of the carriage and is driven by a feed screw or other drive located between the carriage and the machine frame.

Such known laser scanning apparatus generally require large, massive, heavy, and therefore expensive, constructions. Moreover, they do not provide convenient access to the working medium.

OBJECTS AND BRIEF SUMMARY OF THE INVENTION

An object of the present invention is to provide laser scanning apparatus having advantages in the above respects.

According to the present invention, there is provided laser scanning apparatus, comprising: a machine frame; a first supporting member for supporting a working medium; and a second supporting member for supporting at least the delivery end of a laser beam delivery system; characterized in that one of said supporting members is a movable carriage mounted in cantilever fashion from one side of the machine frame for effecting relative movement between said working medium and said delivery end of the laser beam delivery system to cause the laser beam to scan the working medium.

According to further features in preferred embodiments of the invention described below, the machine frame includes an upper rail for slidably supporting one end of the carriage in cantilever fashion; and a linear bearing surface below and parallel to the rail, the linear bearing surface being engageable with a lower part of the carriage to prevent pivoting of the carriage on the upper rail and to permit only linear movement of the carriage along that rail.

More particularly, in the described preferred embodiments, the rail is formed with an upper face having inner and outer angled bearing surfaces intersecting along an intermediate line extending axially of the rail; and the one end of the carriage includes a bar having a lower face formed with inner and outer angled bearing surfaces complementary to those at the upper face of the rail.

As will be described more particularly below, laser scanning apparatus constructed in accordance with the foregoing features provides more convenient access to the working medium. In addition, the feed screw, or other drive, may be located at the side of the carriage such as not to interfere with the laser beam. Further, such features enable a much lighter construction, in many cases enabling the weight to be reduced by one-half, so as to permit easier assembly and lower cost.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
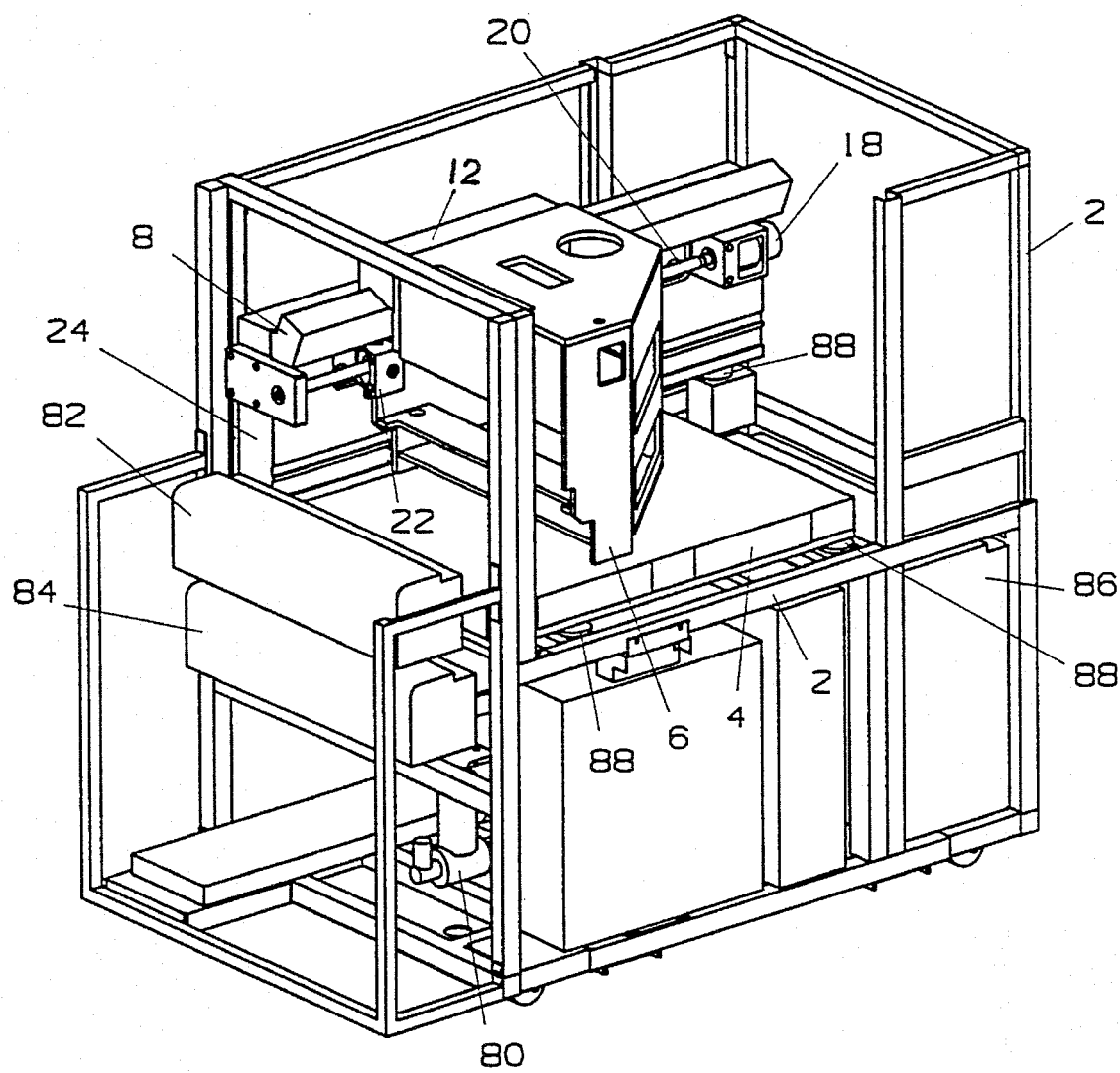
FIG. 1 is a three-dimensional view illustrating one form of laser scanning apparatus constructed in accordance with the present invention, but with the elements of the laser beam delivery system removed for purposes of clarity.
Figure 2:
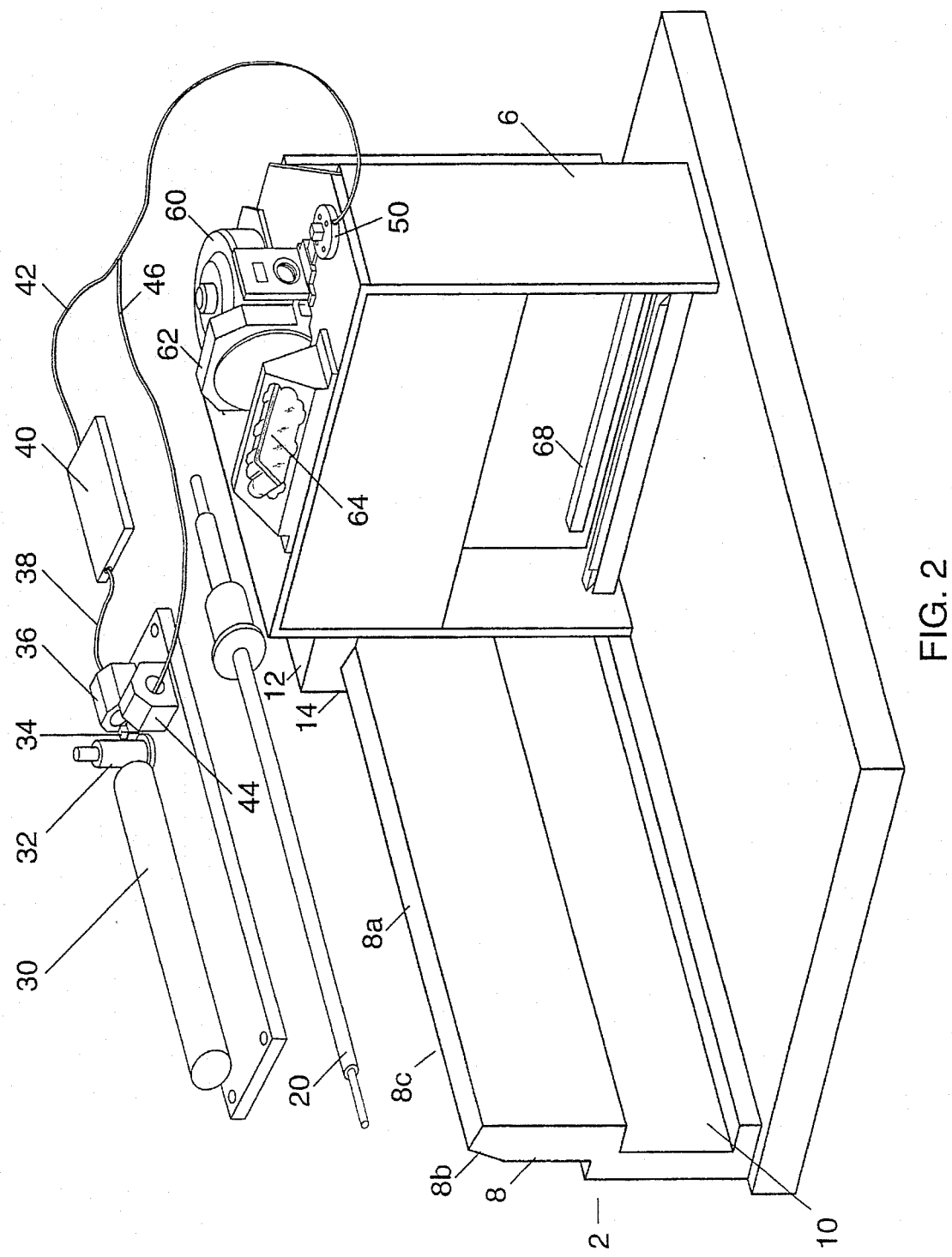
FIG. 2 is a three-dimensional partly-exploded view particularly illustrating the elements of the laser beam delivery system in the laser scanning apparatus of FIG. 1; and a slightly modified movable carriage arrangement on which some of such elements are mounted.
Figure 3:
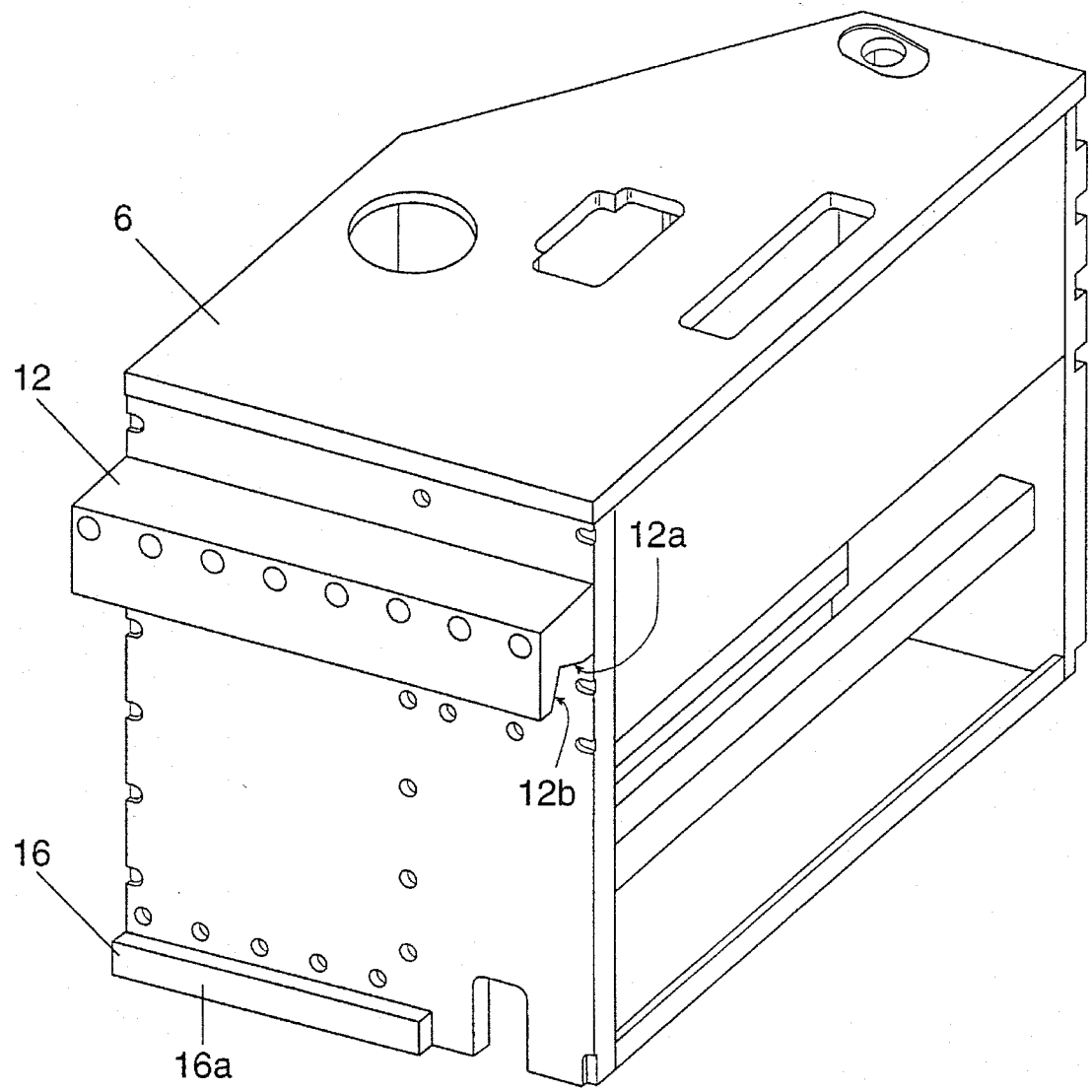
FIG. 3 is an anlarged, three-dimensional view particularly illustrating the cantilever mounting of the movable carriage in the apparatus of FIGS. 1 and 2.

The laser scanning apparatus illustrated in FIGS. 1–3 of the drawings includes a machine frame 2 supporting a flat base or table 4 for receiving the working medium, such as a flat sheet (not shown) to be scanned by a laser beam for recording data thereon or for reading such data from the working medium. The illustrated apparatus further includes a carriage 6 carrying at least the delivery end of a laser beam delivery system. Carriage 6 is movable over the working medium on table 4 so as to deliver the laser beam to any part of the working medium on the table.

An important feature in the apparatus illustrated in FIGS. 1–3 is that the carriage 6 is not mounted in the conventional manner for movement along guides on the two opposite sides of the table 4, but rather is mounted in cantilever fashion only from one side of the frame 2.

Thus, the machine frame 2 includes an upper rail 8 slidably supporting one end of carriage 6 in cantilever fashion. The upper face of rail 8 is formed with inner and outer angled bearing surfaces 8a, 8b, intersecting along an intermediate line 8c extending axially of the rail. The frame 2 is further formed with a flat, vertical, recessed surface 10 below and extending parallel to rail 8.

As shown particularly in FIG. 3, a bar 12 is fixed to the upper end of carriage 6 to be supported in cantilever fashion by rail 8. The lower face of bar 12 is formed with inner and outer angled bearing surfaces 12a, 12b complementary to the bearing surfaces 8a, 8b formed in the upper face of rail 8. A second bar 16 is secured to carriage 6 below bar 12. Bar 16 is formed with a flat vertically-extending surface 16a engageable with the fixed surface 10 below rail 8.

It will thus be seen that when bar 12 of the carriage 6 is applied over rail 8 of the machine frame 2, the angled faces 8a, 8b of the rail, and the complementary angled faces 12a, 12b of the carriage bar, form linear bearing surfaces permitting the carriage to be slidably moved along the rail. In addition, flat face 16a of the carriage bar 16, and the flat vertical surface 10 below rail 8 which face 16a engages, define further linear bearing surfaces which prevent the carriage from pivoting about the rail 8 and permit only linear movement of the carriage along the rail.

Carriage 6 is driven longitudinally of table 4 by electric motor 18 supported by the machine frame 2 and driving a lead screw 20 received within a nut 22 carried by the carriage. As shown particularly in FIG. 1, motor 18, lead screw 20 and nut 22 are all located laterally of the carriage 6. FIG. 2 illustrates a modification wherein the foregoing elements of the drive are located within a recess in the frame defined by flat bearing surface 10, such that the drive elements do not interfere with the laser beam delivered by the elements on carriage 6 to the working medium on table 4.

Figure 4:
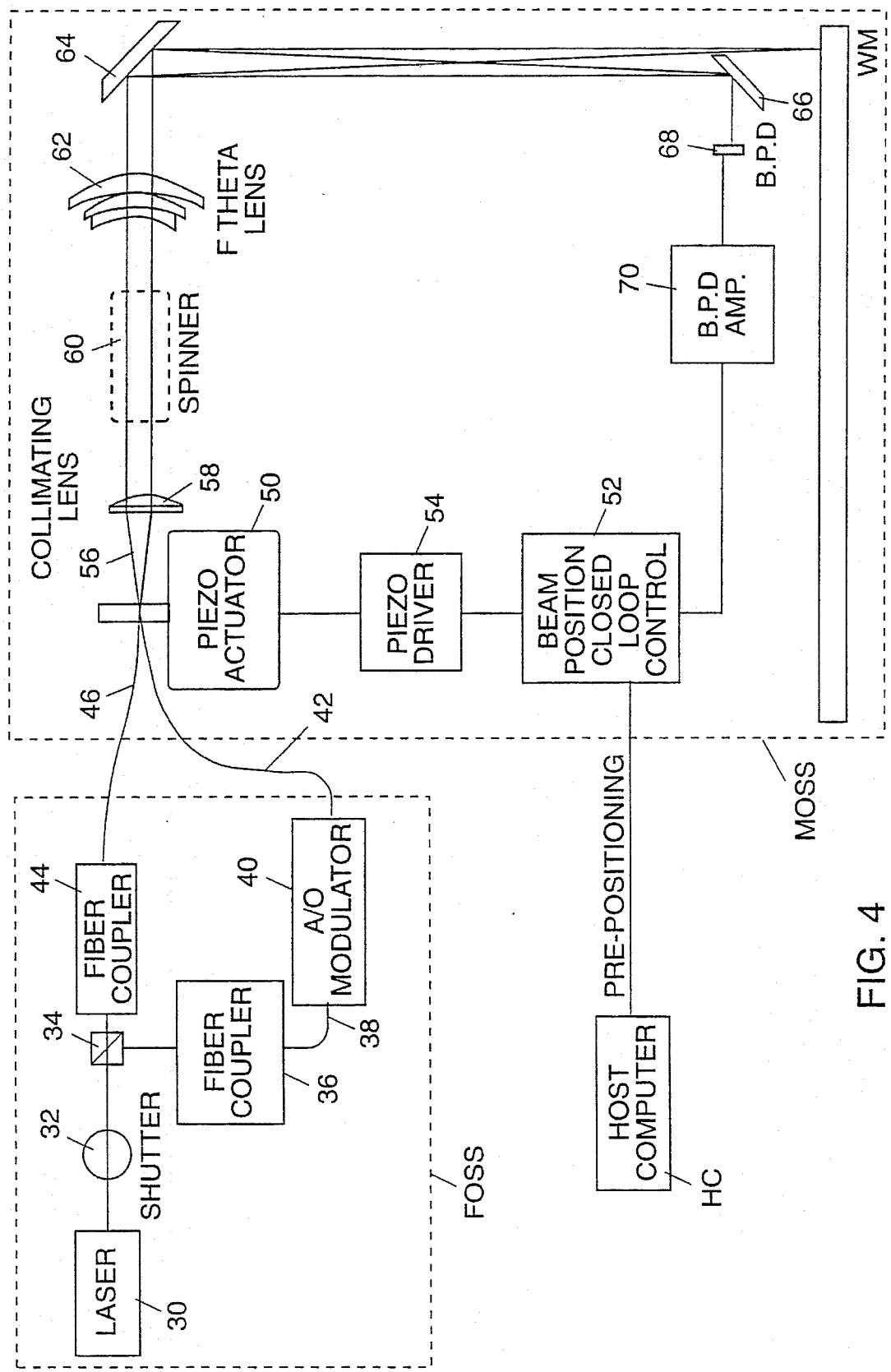
FIG. 4 is a diagram illustrating the construction and operation of the laser beam delivery system in the apparatus of FIGS. 1–3.

The elements of the laser beam delivery system are more particularly illustrated in FIGS. 2 and 4. The system comprises a fixed optical sub-system FOSS (FIG. 4) including other elements fixed to the machine frame, and a movable optical sub-system MOSS (FIG. 4) carried by the carriage 6. The fixed sub-system FOSS is coupled to the movable sub-system MOSS by a optical fiber lightguide.

Thus, as shown in FIGS. 2 and 4, the elements of the fixed optical sub-system FOSS include the laser tube 30 for producing a laser beam; a shutter 32 for blocking the beam when desired; and a beam splitter 34 for splitting the laser into two beams, namely a working beam and a reference beam. The working beam is fed via a fiber coupler 36 and an optic fiber lightguide 38 to an acousto/optic modulator 40, which controls the intensity of the working beam. The working beam emerging from modulator 40 is fed to the movable optical sub-system MOSS via an optical fiber lightguide 42. The reference beam from beam splitter 34 is fed to the movable optical sub-system MOSS via a fiber coupler 44 and an optical fiber lightguide 46.

As described below, acousto/optic modulator 40 is operative to turn on and off the transmission of the working beam in accordance with data signals received from a host computer HC (FIG. 4); and the reference beam is used to control the location of the working beam.

The movable optical sub-system MOSS carried by carriage 6 includes a common piezo-actuator 50 to which the ends of the two lightguides 42, 46 are attached. Actuator 50 is controlled by a control unit 52 via a driver 54 in a manner to be described more particularly below.

The working and reference beams from both lightguides 42, 46 are transmitted together, as shown at 56 (FIG. 4) to a collimating lens 58 where, after collimation, they are deflected to a rotating mirror 60. Mirror 60 deflects the two beams and projects them through an f-0 lens 62. Both beams are then projected towards the working medium WM on the table 4 via a mirror 64. From mirror 64, the working beam is projected directly onto the working medium WM, while the reference beam is reflected from a mirror 66 onto a beam position detector (BPD) 68.

Lens 62 extends the focal lengths of the two beams towards the extremities of the arc, thus flattening most of the arc into a straight line. The final adjustment at the extreme ends of the line is accomplished electronically by increasing the intensity of the beam. Thus, lens 62 ensures sharp focus of the working beam on the working medium WM, and of the reference beam on the beam position detector (BPD) 68 along the entire scan line, and substantially eliminates wide-angle distortion.

The BPD 68 is operative to measure the location of the reference beam along the X-axis and Y-axis of a scan line. The location is then utilized in a closed fedback loop, including amplifier 70, and the previously-mentioned control unit 52, to maintain the working beam at the correct location on the scanned line.

In the apparatus illustrated in FIG. 1, the table 4 receiving the working medium is a suction table, being formed with suction holes for firmly gripping the working medium. Such apparatus, therefore, includes a vacuum pump 80 for supplying the suction. The apparatus further includes a pair of loading cassettes 82, 84, at one end of table 4 for supplying the working medium (e.g., film), and an unloading cassette 86 at the opposite end of the table for receiving the working medium. The suction table 4 is mounted on a horizontal section 2a of frame 2 by a plurality of shock absorbers 88.

The remainder of the construction of the apparatus illustrated in FIGS. 1–4, and the operation of such apparatus, are substantially the same as in existing laser plotters, except that, whereas in existing laser plotters, the carriage is mounted for movement along guides on its two opposite sides, in the construction of FIGS. 1–4 the carriage 6 is mounted in cantilever fashion from one side of the machine frame 2, as described above. The laser beam generating end of the system, including laser 30 and modulator 40, are all part of the fixed optical sub-system FOSS, mounted on the fixed frame, whereas the laser beam delivery end of the system, including the elements 50–70 illustrated in FIG. 4, are all part of the movable optical sub-system MOSS mounted on the carriage 6, and are connected to the fixed sub-system FOSS via the two optical fiber lightguides 42, 46.

Such a construction thus substantially reduces the mass and weight of the apparatus; it provides an up to 50% savings in weight. The size of the base may thus be dependent on the size of the working medium, so that when smaller working media are used, the size of the base may be reduced accordingly. Such a construction is more adaptable both to changes in sizes of working media, and to additions to the apparatus.

In addition, such a construction enables more convenient access to the working medium on the table 4, since access is provided from three sides. Further, the feed screw (or other drive) for driving the carriage is located laterally of the carriage and therefore does not interfere with the laser beam delivery system.

A further advantage of such a construction is that it enables the scanning system to be mounted on existing apparatus used for other purposes. The latter advantage is more particularly shown by the apparatus illustrated in FIG. 5.

Figure 5:
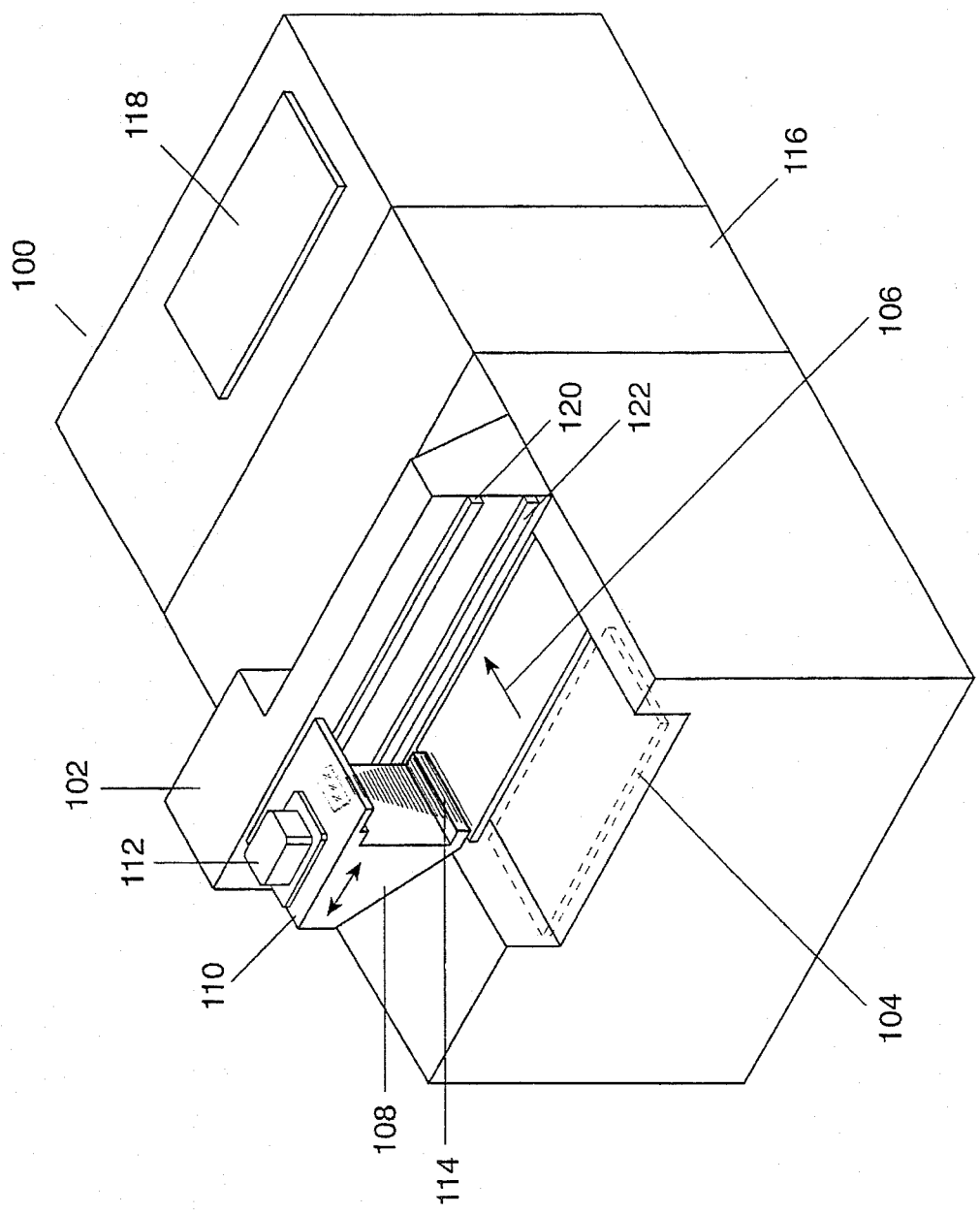
FIG. 5 illustrates another construction of laser scanning apparatus in accordance with the present invention.

Thus, FIG. 5 illustrates, for example, a printing or proofing machine 100 including a stationary frame 102. The machine further includes a table 104 movable from an initial position shown at 104', through an exposure station 106 to which unexposed working media are individually fed for exposure by a laser beam delivery system partly (or completely) carried by a carriage 110 movable over table 104. Thus, carriage 110 carries the beam-delivery part of the laser beam delivery system (schematically indicated by box 112) which directs a laser beam (schematically indicated at 114) over the complete surface of the working medium on table 104. The working medium, when so exposed, is fed to a processing area 116 where it is processed and delivered at the opposite end of the machine, as indicated by working medium 118 in FIG. 5.

In the machine illustrated in FIG. 5, the stationary frame 102 of the machine is also used for mounting the carriage 110 in cantilever fashion over the table 104 supporting the working medium in the exposure station 106. Thus, the stationary frame 102 includes an upper supporting rail 120, and a lower bearing surface 122, corresponding to rail 8 and bearing surface 10 in the FIGS. 1–4 construction.

It will be appreciated that the laser beam delivery system, and the drive for the carriage 110, may be as described above with respect to FIGS. 1–4.

In the two constructions illustrated in FIGS. 1–4 and FIG. 5, respectively, the cantilever-mounted carriage supports the beam-delivery part of the laser beam delivery system, whereas the fixed table supports the working medium. It will be appreciated, however, that the movable carriage could support the working medium, and the fixed table could support all or part of the laser beam delivery system. It will also be appreciated that other cantilever-mounting arrangements could be used for mounting the carriage.

Many other variations, modifications and applications of the invention will be apparent.

What is claimed is:

1. Laser scanning apparatus, comprising:

a machine frame;

a first supporting member for supporting a working medium; and a second supporting member for supporting at least the delivery end of a laser beam delivery system;

one of said supporting members being a movable carriage mounted in cantilever fashion from one side of the machine frame for effecting relative movement between said working medium and said laser beam delivery system to cause the laser beam to scan the working medium;

said machine frame including an upper rail for slidably supporting one end of said carriage in cantilever fashion, and a linear bearing surface below and parallel to said rail;

said linear bearing surface being engageable with a lower part of the carriage to prevent pivoting of the carriage on said upper rail and to permit only linear movement of the carriage along said rail.

2. The apparatus according to claim 1, wherein:

said rail is formed with an upper face having inner and outer angled bearing surfaces intersecting along an intermediate line extending axially of the rail;

and said one end of the carriage includes a bar having a lower face formed with inner and outer angled bearing surfaces complementary to those at said upper face of the rail.

3. The apparatus according to claim 1, wherein said linear bearing surface below and parallel to said rail is a flat vertically-extending surface.

4. The apparatus according to claim 1, further including a lead screw drive for driving said movable carriage.

5. The apparatus according to claim 4, wherein said lead screw drive is located laterally of said movable carriage.

6. The apparatus according to claim 1, wherein said machine frame includes a fixed bed for supporting said working medium, and the cantilever-mounted carriage supports at least the delivery end of the laser beam delivery system.

7. The apparatus according to claim 6, wherein said laser beam delivery system comprises a fixed optical sub-system including a laser fixed to the machine frame, a movable optical sub-system carried by said carriage and movable therewith, and an optical fiber lightguide coupling said fixed optical sub-system to said movable optical sub-system.

8. The apparatus according to claim 7, wherein said fixed optical sub-system further includes a shutter fixed to the machine frame.

9. The apparatus according to claim 7, wherein said fixed optical sub-system further includes a modulator fixed to the machine frame for modulating the laser beam conducted to said movable optical sub-system via said optical fiber lightguide.

10. The apparatus according to claim 7, wherein said movable optical sub-system carried by the carriage includes a rotating mirror for scanning the laser beam transversely of the direction of movement of the carriage.

11. The apparatus according to claim 10, wherein said movable optical sub-system carried by the carriage further includes a collimating lens between the optical fiber lightguide and the rotating mirror.

12. The apparatus according to claim 11, wherein said movable optical sub-system carried by the carriage further includes a piezoelectric actuator engaging the end of the optical fiber lightguide for moving it relative to the collimating lens.

13. The apparatus according to claim 6, wherein said fixed optical sub-system further includes a beam splitter fixed with respect to the machine frame for splitting the laser beam into a working beam and a reference beam; both said working beam and reference beam being coupled by said optical fiber lightguide to the movable optical sub-system carried by said carriage. ;

14. The apparatus according to claim 13, wherein said movable optical sub-system carried by the carriage further includes a beam position detector for detecting the location of the reference beam, and for controlling the location of the working beam in accordance with the detected location of the reference beam.

15. The apparatus according to claim 6, wherein said movable optical sub-system carried by the carriage further includes a long mirror for projecting the laser beam from said rotating mirror onto the working medium.

16. Laser scanning apparatus, comprising:

a machine frame including a fixed bed for supporting a working medium;

a laser beam delivery system for delivering a laser beam via one end thereof;

a movable carriage for supporting at least the delivery end of said laser beam delivery system;

and a drive for said movable carriage:

said carriage being mounted in cantilever fashion from one side of the machine frame for effecting relative movement between said working medium and said laser beam delivery system to cause the laser beam to scan the working medium;

said machine frame including an upper rail for slidably supporting one end of said carriage in cantilever fashion, and a linear bearing surface below and parallel to said rail;

said linear bearing surface being engageable with a lower part of the carriage to prevent pivoting of the carriage on said upper rail and to permit only linear movement of the carriage along said rail.

17. The apparatus according to claim 16, wherein:

said rail is formed with an upper face having inner and outer angled bearing surfaces intersecting along an intermediate line extending axially of the rail;

and said one end of the carriage includes a bar having a lower face formed with inner and outer angled bearing surfaces complementary to those at said upper face of the rail.

18. The apparatus according to claim 16, further including a lead screw drive for driving said movable carriage, said lead screw drive being located laterally of said movable carriage.

* * * * *